United States Patent Office 3,404,168
Patented Oct. 1, 1968

3,404,168
URETHANE MODIFIED MERCAPTOMETHYL SILOXANES
Walter Simmler, Cologne-Mulheim, Hans Niederprum, Monheim, Walter Noll, Leverkusen, and Karl Schnurrbusch, Cologne-Flittard, Germany, assignors to Farbenfabriken Bayer Aktiengesellschaft, Leverkusen, Germany, a German corporation
No Drawing. Filed July 20, 1964, Ser. No. 383,986
Claims priority, application Germany, July 22, 1963, F 40,294
5 Claims. (Cl. 260—448.2)

ABSTRACT OF THE DISCLOSURE

A urethane modified mercaptomethyl siloxane having the generic formula

wherein $n$ is a numerical value larger than 1 and at most equal to 3, and at least one of the substituents R has the formula

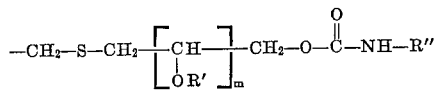

wherein R' is a member selected from the group consisting of hydrogen and

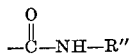

R'' is a radical remaining after removing one —NCO group from an organic isocyanate; $m$ is a member selected from the group consisting of 0 and 1 and the remainder of the substituents R of the generic formula are monovalent organic radicals. The urethane mercaptomethyl siloxanes can be used as surfactants or emulsifiers.

---

This invention relates to the production of liquid urethane derivatives, and more particularly, to the production of liquid urethanes modified with mercaptomethyl siloxanes, which are hydrolysis resistant and which possess surface active properties.

Heretofore in the production of carbofunctional polysiloxanes which have good surface active properties, and especially of polysiloxane-polyether copolymers it has been difficult to maintain a sufficient degree of control over the reaction and therefore, the structure of the siloxane and polyether blocks in the polysiloxane. The polysiloxane reactants react too much at random making impossible controlled production of polyether substituted polysiloxanes. Consequently, the preparation of watersoluble polyether substituted polysiloxanes having the desired chain lengths required to fabricate a certain surfactant has been correspondingly difficult if not impossible.

Further, as is known in the art such surfactants in many cases have to be carefully adapted to the system in which they are to be used and those surface active carbofunctional polysiloxanes obtained by known processes contain polysiloxane and polyether blocks which generally have neither the degree of polymerization nor the structure of the initial blocks from which they were prepared.

It is therefore an object of this invention to provide a siloxane modified urethane which is devoid of the foregoing disadvantages.

It is a further object of this invention to provide a stable urethane modified polysiloxane which is easily prepared in controlled reactions to yield a polymer having the structure and composition desired.

Still another object of this invention is to prepare a urethane polysiloxane well suited to be used as a surfactant.

These and other objects are accomplished in accordance with this invention, generally speaking, by providing a carbofunctional siloxane having the generic formula

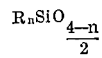

wherein $n$ is a positive numerical value greater than one and at most equal to three; at least one of the substituents R is a urethane-substituted mercaptomethyl radical bonded to silicon with all other substituents R, which are not urethane-substituted mercaptomethyl radicals, being monovalent organic radicals including neutrally substituted hydrocarbon radicals, preferably methyl radicals alone, or else, methyl and phenyl radicals. The urethane-substituted mercaptomethyl radicals referred to above corresponding to the substituent R in the generic formula, have the structure

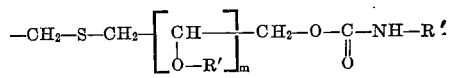

wherein R' is either

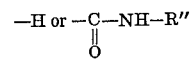

$m=0$ or 1, and R'' is the radical remaining after removing one —NCO group from a diisocyanate or a triisocyanate, including the radical formed by the addition of a di- or triisocyanate to a monohydric aliphatic alcohol, a polyhydric aliphatic alcohol, a polyalkylene glycol, a polyalkylene glycol monoalkyl ether, an organopolysiloxane substituted with β-hydroxyethyl mercaptomethyl, an organopolysiloxane substituted with β,γ-dihydroxypropyl mercaptomethyl, or to the amino group of a urethane formed during the manufacturing process.

Where the group of radicals last referred to have more than one function such as, for example, polyhydric alcohols, polyalkylene glycols, organopolysiloxanes and/or urethanes, these in turn may be added with an organopolysiloxane hereinbefore described which is substituted with a urethane mercaptomethyl radical.

Therefore, each of the siloxane units containing the aforesaid urethane substituted mercaptomethyl radical, has the formula

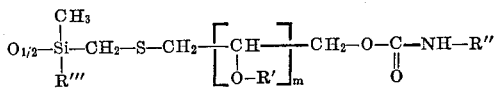

wherein

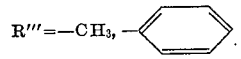

or —O$_{1/2}$, and R', R'' and $m$ are the same as defined hereinbefore.

Any suitable di- or triisocyanate may be used in the practice of this invention. Examples of some such suitable isocyanates are tetramethylenediisocyanate,
hexamethylenediisocyanate,
1,4-phenylenediisocyanate,
1,3-phenylenediisocyanate,
1,4-cyclohexylenediisocyanate,
2,4-tolylenediisocyanate,
2,5-tolylenediisocyanate,
2,6-tolylenediisocyanate,
3,5-tolylenediisocyanate,
4-chloro-1,3-phenylenediisocyanate,
1-methoxy-2,4-phenylenediisocyanate, 1-methyl-3,5-diethyl-2,6-phenylenediisocyanate,
1,3,5-triethyl-2,4-phenylenediisocyanate,
1-methyl-3,5-diethyl-2,4-phenylenediisocyanate,
1-methyl-3,5-diethyl-6-chloro-2,4-phenylenediisocyanate,
6-methyl-2,4-diethyl-5-nitro-1,3-phenylenediisocyanate,
p-xylylenediisocyanate,
m-xylylenediisocyanate,
4,6-dimethyl-1,3-xylylenediisocyanate
1,3-dimethyl-4,6-bis-(β-isocyanatoethyl) benzene,
3-(α-isocyanatoethyl) phenylisocyanate,
1-methyl-2,4-cyclohexylenediisocyanate,
4,4′-biphenylenediisocyanate,
3,3′-dimethyl-4,4′-biphenylenediisocyanate,
3,3′-dimethoxy-4,4′-biphenylenediisocyanate,
3,3′-diethoxy-4,4′-biphenylenediisocyanate,
1,1′-bis-(4-isocyanatophenyl)cyclohexane,
4,4′-diisocyanato-diphenylether,
4,4′-diisocyanato-dicyclohexylmethane,
4,4′-diisocyanatodiphenylmethane (MDI and Mondur MO),
4,4′-diisocyanato-3,3′-dimethyldiphenylmethane,
4,4′-diisocyanato-3,3′-dichlorodiphenylmethane,
4,4′-diisocyanato-diphenyl-dimethylmethane,
1,5-naphthylene-diisocyanate,
4,4′,4″-triisocyanato-triphenylmethane,
2,4,4′-triisocyanato-diphenylether,
2,4,6-triisocyanato-1-methyl-3,5-diethylbenzene, and
O,O,O-tris(4-isocyanatophenyl) phosphorothioate.

Any suitable aliphatic polyol may be used such as, for example, alkane diols such as, for example ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol and the like including 1,20-eicosane diol and the like; alkene diols such as, for example, 1-butene-1,4-diol, 1,3-butadiene-1,4-diol, 2-pentene-1,5-diol, 2-hexene-1,6-diol, 2-heptene-1,7-diol and the like; alkyne diols such as, for example, 2 - butyne - 1,4 - diol, 1,5-hexadiyne-1,6-diol and the like; alkane triols such as, for example, glycerine, 1,3,6-hexanetriol, 1,3,7-heptane triol, 1,4,8-octane triol, 1,6,12-dodecane triol trimethylolpropane, pentaerythritol and the like; alkene triols such as 1-hexene-1,3,6-triol and the like; alkyne triols such as 2-hexyne-1,3,6-triol and the like; alkane tetrols such as, for example, 1,2,5,6-hexane tetrol and the like; alkene tetrols such as, for example, 3-heptene-1,2,6,7-tetrols and the like; alkyne tetrols such as, for example, 4-octyne-1,2,7,8-tetrol and the like.

Any suitable polyalkylene glycol monoalkyl ether may be also used and the polyalkylene glycol monoalkyl ether may contain several organic radicals in the polyalkylene oxide chain. That is, they may be copolymerized in a known manner from several alkylene oxides, such as, for example, by a combination of ethylene oxide and propylene oxide, butylene oxide, styrene oxide and the like, to prepare suitable polyalkylene glycol monoalkyl ethers such as polyethylene glycol-propylene glycol monobutyl ether and the like.

The polyalkylene glycol component of the reaction mixture can also be any suitable polyalkylene ether having at least two terminal alcoholic hydroxyl groups such as, for example, the condensation product of an alkylene oxide with a small amount of a compound containing reaction hydrogen containing groups including for example, water, ethylene glycol, propylene glycol, butylene glycol, amylene glycol, trimethylolpropane, glycerine, pentaerythritol, hexanetriol, sugar, phenol, hydroquinone, 4,4′-dihydroxydophenylmethane and the like. Any suitable alkylene oxide may be used in the condensation such as, for example, ethylene oxide, propylene oxide, butylene oxide, amylene oxide, mixtures thereof and the like. Furthermore, tetrahydrofuran can be polymerized to form a suitable polytetramethylene ether glycol. The condensation of the alkylene oxide to form a suitable polyalkylene ether having terminal hydroxyl groups can be prepared by any suitable condensation process such as, for example, by the process described by Wurtz in the "Encyclopedia of Chemical Technology," vol. 7, pages 257 to 262, published by Interscience Publishers in 1951. The process described in U.S. Patent 1,922,459 can also be used for making a suitable polyalkylene ether having terminal hydroxyl groups. Suitable polyalkylene ethers can also be prepared from epichlorohydrin or styrene oxide.

The organic radical, R, in the generic formula

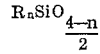

$$R_n SiO_{\frac{4-n}{2}}$$

may be any suitable organic radical. The term "organic radical" includes univalent aliphatic, cycloalpihtic, aromatic and heterocyclic radicals and substituted derivatives thereof. The organic radicals may be substituted with any substituent such as, for example, halogeno such as, for example, chloro, bromo, iodo, fluoro and the like; nitro; alkoxy such as, for example, methoxy, ethoxy, propoxy, butoxy, amoxy and the like; carboalkoxy such as, for example, carbomethoxy, carbethoxy and the like; dialkyl amino such as, for example, dimethyl amino, diethyl amino, dipropyl amino, methylethyl amino and the like; mercapto; carbonyl; thiocarbonyl; hydroxy; phosphato; phosphoryl and the like.

When aliphatic radicals are the organic radicals in the above formula they may be for example, alkyl, alkenyl, aralkyl and/or aralkenyl.

Any suitable alkyl radical may be the organic radical such as, for example, methyl, ethyl, n-propyl, isopropyl, n-butyl, isobutyl, sec-butyl, t-butyl, n-amyl and various isomers thereof such as, for example, 1-methyl-butyl, 2-methyl-butyl, 1,1-dimethylpropyl, 1,2-dimethylpropyl, 2,2-dimethypropyl, 1-ethylpropyl and the like and the corresponding straight and branched chain isomers of hexyl, heptyl, octyl, nonyl, decyl, undecyl, dodecyl, tridecyl, tetradecyl, pentadecyl, hexadecyl, heptadecyl, octadecyl, nondecyl, eicosyl and the like.

Any suitable alkenyl radical may be the organic radical such as, for example, ethenyl, 1-propenyl, 2-propenyl, isopropenyl 1-butenyl, 2-butenyl, 3-butenyl and the corresponding branched chain isomers thereof such as, for example, 1-isobutenyl, 2-isobutenyl, 1-sec-butenyl, 2-sec-butenyl, including 1-methylene-2-propenyl, 1-pentenyl, 2-pentenyl, 3-pentenyl, 4-pentenyl and the corresponding branched chain isomers thereof; 1-hexenyl, 2-hexenyl, 3-hexenyl, 4-hexenyl, 5-hexenyl and the corresponding branched chain isomers thereof such as, for example, 3,3-dimethyl-1-butenyl, 2,3-dimethyl-1-butenyl, 2,3-dimethyl-2-butenyl, 2,3-dimethyl-3-butenyl, 1-methyl-1-ethyl-2-propenyl and the various isomers of heptenyl, octenyl, nonenyl, decenyl, undecenyl, dodecenyl, tridecenyl, tetradecenyl, pentadecenyl, hexadecenyl, heptadecenyl, octadecenyl, nondecenyl, eicosenyl and the like.

Any suitable aralkyl radical may be the organic radical such as, for example, benzyl, α-phenyl-ethyl, β-phenyl-ethyl, α-phenyl-propyl, β-phenyl-propyl, gamma-phenyl-propyl, α-phenyl-isopropyl, β-phenyl-isopropyl, α-phenyl-butyl, β-phenyl-butyl, gamma-phenyl-butyl, delta-phenyl-butyl, α-phenyl-isobutyl, β-phenyl-isobutyl, gamma-phenyl-isobutyl, α-phenyl-sec-butyl, β-phenyl-sec-butyl, gamma-phenyl-sec-butyl, β-phenyl-t-butyl, α′-naphthyl-methyl, β′-naphthyl-methyl and the corresponding α′- β′-naphthyl derivatives of n-amyl and the various positional isomers thereof such as, for example, 1-methyl-butyl, 2-methyl-butyl, 3-methyl-butyl, 1,1-dimethylpropyl, 1,2-dimethyl-propyl, 2,2-dimethyl-propyl, 1-ethyl-propyl and said derivatives of the corresponding isomers of hexyl, heptyl, octyl and the like including eicosyl and the corresponding alkyl derivatives of phenanthrene, fluorene, acenaphthene, chrysene, pyrene, triphenylene, naphthacene and the like.

Any suitable aralkenyl radical may be the organic radical such as, for example, α-phenyl-ethenyl, β-phenyl-ethenyl, α-phenyl-1-propenyl, β-phenyl-1-propenyl, gamma-phenyl-1-propenyl, α-phenyl-2-propenyl, β-phenyl-2-propenyl, gamma - phenyl-2-propenyl, β-phenyl-isopropenyl and phenyl derivatives of the isomers of butenyl, pentenyl, hexenyl, heptenyl up to and including eicosenyl and other aromatic derivatives of alkenyl, that is alkenyl radicals derived from naphthalene, phenanthrene, fluorene, acenaphthene, chrysene, pyrene, triphenylene, naphthacene and the like.

Any suitable cycloalkyl radical may be the organic radical such as, for example, cyclopropyl, cyclobutyl, cycloamyl, cyclohexyl, cycloheptyl, cyclooctyl, cyclononyl, cyclodecyl, cycloundeceyl, cyclododecyl, cyclotridecyl, cyclotetradecyl, cyclopentadecyl, cyclohexadecyl, cycloheptadecyl, cyclooctadecyl, cyclononecyl, cycloeicosyl, α-cyclopropyl-ethyl, β-cyclopropyl-ethyl, α-cyclobutyl-propyl, β-cyclobutyl-propyl, gamma-cyclobutyl-propyl, α-cycloamyl-isopropyl, β-cycloamyl-isopropyl and the like.

Any suitable cycloalkenyl radical may be the organic radical such as, for example, α-cyclohexyl-ethenyl, β-cyclohexyl-ethenyl, α-cycloheptyl-1-propenyl, β-cycloheptyl-1-propenyl, gamma-cycloheptyl-1-propenyl, α-cyclooctyl-2-propenyl, β-cyclooctyl-2-propenyl, gamma-cyclooctyl-2-propenyl, β-cyclononylisopropenyl, α-methylene-β-cyclododecyl-ethyl and the like.

Any suitable aryl radical may be the organic radical such as, for example, phenyl-α-naphthyl, β-naphthyl, α-anthryl, β-anthryl, gamma-anthryl including the various monovalent radicals of indene, isoindene, acenaphthene, fluorene, phenanthrene, naphthacene, chrysene, pyrene, triphenylene and the like.

Any suitable alkaryl radical may be the organic radical such as, for example, o-tolyl, m-tolyl, p-tolyl, 2,3-xylyl, 2,4-xylyl, 2,5-xylyl, 2,6-xylyl, 3,4-xylyl, 3,5-xylyl, o-cumenyl, m-cumenyl, p-cumenyl, mesityl, o-ethylphenyl, m-ethylphenyl, p-ethylphenyl, 2-methyl-α-naphthyl, 3-methyl-α-naphthyl, 4-methyl-α-naphthyl, 5-methyl-α-naphthyl, 6 - methyl - α-naphthyl, 7-methyl-α-naphthyl, 8-methyl-α-naphthyl, 1-ethyl-β-naphthyl, 3-ethyl-β-naphthyl, 4-ethyl-β-naphthyl, 5-ethyl-β-naphthyl, 6-ethyl-β-naphthyl, 7-ethyl-β-naphthyl, 8-ethyl-β-naphthyl, 2,3 - dipropyl-α-naphthyl, 5,8-diisopropyl-β-naphthyl and the like.

Generally, in the production of the mercaptomethyl siloxane-modified urethanes according to the invention, a β-hydroxy-ethyl mercaptomethyl polysiloxane or a β,γ-dihydroxypropyl mercaptomethyl polysiloxane of the general formula

is used. The value $n$ in the foregoing formula is a positive number greater than 1 and at most equal to 3 and at least one of the radicals X bonded to the silicon has the formula

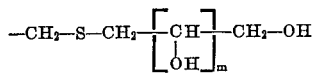

wherein $m=0$ or 1. The siloxane units which contain the last-mentioned radicals have the general formula

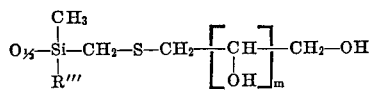

wherein

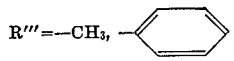

or $O_{1/2}$, and $m=0$ or 1. In all the other siloxane units, where the substituent X does not have the above formula, X is a monovalent organic radical as set forth above, any may be a neutrally substituted hydrocarbon radical. Preferably it is a methyl or phenyl radical.

In order to prepare such polysiloxanes, bromomethyl-substituted silanes or siloxanes, for example, are reacted with β-hydroxyethyl mercaptan or 1-thioglycerine, and the process for carrying out the preparation is one of those which are described in U.S. patent application Ser. Nos. 286,909 and 329,875, filed June 11, 1963 by Simmler and Niederprüm, and Dec. 11, 1963 by Simmler, Niederprüm and Jonas, respectively.

The hydroxyalkyl mercaptomethyl polysiloxanes thus prepared may then be reacted with a diisocyanate or a triisocyanate and, optionally, with a monohydric or polyhydric aliphatic alcohol, a polyalkylene glycol or a polyalkylene glycol monoalkyl ether such as those listed hereinbefore, at temperatures between about 20° and 130° C. An inert solvent, particularly toluene, as well as catalysts, e.g. a tertiary amine as triethyl amine, may be added.

In the preparation of organopolysiloxanes in which one of the silicon-free hydroxyl compounds enumerated hereinbefore is used in the formation of the R″ radical, thus forming a urethane or allophanate radical, the process of the invention may be carried out with a different sequence of reaction steps. For example, the polysiloxane

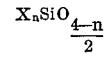

hereinbefore defined, may be mixed initially with the polyisocyanate and the silicon-free hydroxyl compound. For the production of uniform block-linked polymers, however, it is preferable to carry out the process in two stages. In such a case, either the polysiloxane,

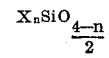

or the silicon-free hydroxyl compound is first reacted with more than an equivalent quantity of the isocyanate and the urethane thus formed which contains free —NCO groups is then reacted with the remaining of the two hydroxyl containing compounds.

In either case, however, the quantities of the reactants used may be proportioned so that the sum of the hydroxyl groups is equivalent to the sum of the isocyanato groups, or, alternatively, so that a product containing either terminal hydroxyl or terminal isocyanato groups may be obtained.

Some specific examples of urethane-modified mercaptomethyl polysiloxanes are illustrated below in Formulae I to XXI, in which it is often only possible to designate the arrangement of the separate molecular groups statistically.

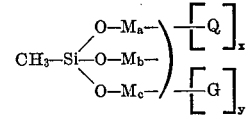

(I) $a+b+c=18.7$; $x=1$; $y=2$
(II) as I with $a+b+c=18.7$; $x=0.66$; $y=2.33$
(III) as I with $a+b+c=18.7$; $x=0.33$; $y=2.66$
(IV) as I with $a+b+c=18.7$; $x=0$; $y=3$

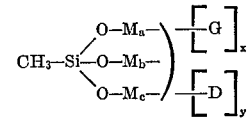

(V) $a+b+c=13.6$; $x=3$; $y=0$
(VI) as V with $a+b+c=13.6$; $x=2.66$; $y=0.33$
(VII) as V with $a+b+c=13.6$; $x=2.33$; $y=0.66$
(VIII) as V with $a+b+c=13.6$; $x=2.0$; $y=1.0$
(IX) as V with $a+b+c=13.6$; $x=1.5$; $y=1.5$
(X) G—O—$M_z$—G with $z=11$
(XI) as X with $z=6.2$
(XII) as X with $z=8.1$
(XIII) as X with $z=8.9$
(XIV) as I with $a+b+c=3.1$; $x=0$; $y=3$
(XV) as X with $z=11.1$
(XVI) as X with $z=20.9$
(XVII) as I with $a+b+c=5.1$; $x=0$; $y=3$ (XVIII) as I with $a+b+c=6.1$; $x=0$; $y=3$
(XIX) as X with $z=5.1$

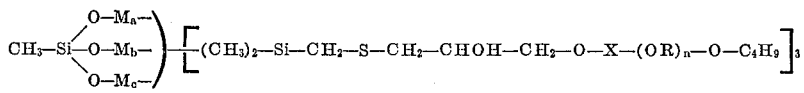

(XX) $a+b+c=6.1$

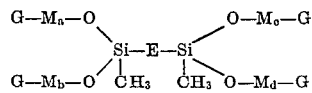

(XXI) $a+b+c+d=30.8$

In these Formulae I–XXI $M=$—(CH$_3$)$_2$SiO—
$Q=$—(CH$_3$)$_2$Si—CH$_2$—S—CH$_2$—CH$_2$—OH
$G=$—(CH$_3$)$_2$Si—CH$_2$—S—CH$_2$—CH$_2$—O—X
—(OR)$_n$—OC$_4$H$_9$
$X=$—OCNH—C$_6$H$_4$—NHCO
—(OR)$_n$—=Radical of a polyalkylene glycol ether of equal parts of ethylene oxide and propylene oxide and $n$ is an integer sufficient to give the radical —(OR) a molecular weight of about 1600.
$D=$—(CH$_3$)$_2$Si—CH$_2$—S—CH$_2$—CH$_2$—O—X'
—(OR)$_n$—OC$_4$H$_9$ in which $X'=X$, but one of the urethane hydrogen atoms in X is replaced by —OCNH—C$_6$H$_4$—NHCO—(OR)$_n$—OC$_4$H$_9$
$E=$—O—(CH$_3$)$_2$Si—CH$_2$—S—CH$_2$—CH$_2$—O
—CH$_2$—Si(CH$_3$)$_2$—O—

The unique urethane product modified with mercaptomethyl siloxane units and produced in accordance with this invention are surprisingly hydrolysis resistant. For example, urethanes which are water-soluble remain stable for more than six months at concentrations of between 10 and 30% by weight in water.

Further, the products of this invention are excellent emulsifiers or surface-active agents and may be used as the emulsifier in the process of U.S. Patent 2,968,575. Since the degree of polymerization and the structure of both the siloxane blocks and the polyether blocks in the molecule remain unchanged during reaction, and since the process for the production of the mercaptomethyl modified urethane is a relatively gentle one compared to known processes for the production of carbofunctional polysiloxanes, it is possible to prepare a polyether-substituted polysiloxane having exactly the desired configuration for the most advantageous application of the polysiloxane as a surface active agent, for example.

In order to illustrate the significance of uniform chain lengths for the efficacy of the surface effect, the following comparison is given. Solutions were prepared from 10 compounds obtained as described in Example 4 (below), each having a concentration of $2\times10^{-5}$ g. in 1 litre of water. The surface tension values for these solutions were uniform between 32 and 34 dyne/cm. By contrast, surface tension values from 32 to 65 dyne/cm. were obtained in a similar series of experiments in which 10 solutions prepared by the the process outlined in French Patent No. 1,290,552 from a polyglycol ether and a polysiloxane containing oxygen instead of sulphur atoms, were used.

The invention is further illustrated by the following examples, in which all parts and percentages are by weight unless otherwise specified.

Example 1

About 4000 g. of a dehydrated polyoxyalkylene glycol mono-n-butyl ether which contains about 1.12% of hydroxyl groups in which the alkylene oxide chain is formed of equal parts by weight of ethylene oxide and propylene oxide, are mixed with about 4 litres of anhydrous toluene and about 458 g. of toluylene-2,4-diisocyanate. The mixture is heated for 2 hours at its boiling point under reflux.

Thereafter, the isocyanate content in about 50 g. of the solution amounts to about 0.66 g. of NCO. About 2385 g. of the reaction mixture (polyetherisocyanate initial product) are mixed with about another 500 cc. of toluene, about 3 g. of triethylamine and about 405 g. of an α,ω-bis-(β'-hydroxyethyl mercaptomethyl)-polydimethylsiloxane, which has a hydroxyl content of about 3.15% and a sulphur content of about 5.8% and which corresponds approximately to the formula

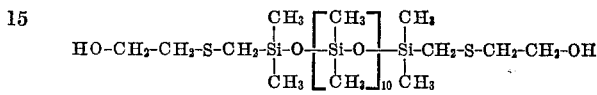

This mixture is heated for 4 hours at the boiling point under reflux. The solvent is then evaporated while passing argon through the reaction mixture at about 20 mm. Hg and heating it up to about 100° C. The residue is the filtered and about 1400 g. of a golden yellow oil is obtained as a filtrate; this contains about 7.7% of silicon and about 1.35% of sulfur. At about 20° C. the density of the oil is about 1.06 g./cc., its viscosity is about 6359 cst. and its refractive index $n_D{}^{20}=$about 1.4679.

Example 2

About 1270 g. of the polyether-isocyanate initial product described in Example 1 are mixed with about 800 cc. of toluene, about 5 g. of triethylamine and about 850 g. of a tris-(β-hydroxyethyl mercaptomethyl)-polymethyl siloxane which has a hydroxyl content of about 0.8% and a sulphur content of about 1.4% and which corresponds approximately to the formula

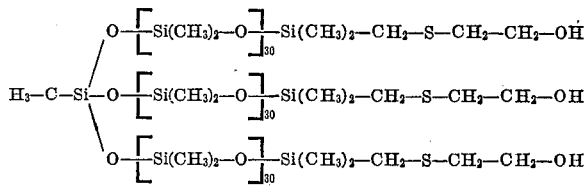

This mixture is heated for about 5 hours to its boiling point under reflux. The solvent is then evaporated while passing argon through the reaction mixture at about 20 mm. Hg and heating it to about 100° C. A yellowish oil is obtained which contains about 17.8% of silicon and and about 0.8% of sulfur. At about 20° C., density of the oil is about 1.035 g./cc., its viscosity is about 12035 cst. and its refractive index $n_D{}^{20}$ is about 1.4415.

Example 3

About 1812 g. of a solution of toluene in which is dissolved about 910 g. of the addition product prepared in the same manner as described in Example 1 from equimolar quantities of polyoxyalkylene glycol monobutyl ether and toluylene diisocyanate and having about 21.8 g. (0.518 mol) of free NCO groups are mixed with a solution of about 499 g. of a tris-(β-hydroxyethyl mercaptomethyl)-polymethylsiloxane, which corresponds approximately to the formula

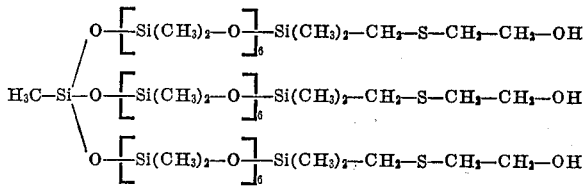

and which contains about 2.65% OH and therefore a total of about 0.78 mol of OH, in about 500 g. of toluene.

This mixture is heated for about 30 minutes to its boiling point under reflux and then about 5.6 g. of triethylamine, which had been distilled beforehand over potassium hydroxide, are added thereto. The mixture is allowed to boil for another 4 hours under reflux. The toluene is distilled off, and the residue is blown with nitrogen at about 30 mm. Hg while being heated to about 80° C. The product is a golden yellow oil. At about 20° C., its density is about 1.065 g./cc., its viscosity is about 3820 cst. and its refractive index $n_D^{20}$ is about 1.4620.

Example 4

The procedure as described in Example 3 is followed, but instead of the quantity of tris-(β-hydroxyethyl mercaptomethyl)-polymethyl siloxane indicated therein, only about 333 g. are used with about 0.518 mol of OH in about 350 g. of toluene. An oil is obtained which has the following physical data at about 20° C.: density=about 1.065 g./cc., viscosity=about 7800 cst., refractive index $n_D^{20}$=about 1.4656.

Example 5

About 2000 g. of a solution of toluene in which is dissolved about 1030 g. of the addition product prepared in the same manner as described in Example 1 from equimolar quantities of polyoxyalkylene glycol monobutyl ether and toluylene diisocyanate and having about 21.99 g. (0.522 mol) of free NCO groups, are mixed with a solution of about 202 g. of tris-(β-hydroxyethylmercaptomethyl)-polymethyl siloxane analogous to that of Example 3 and having about 3.3% OH so that there is a total of about 0.393 mol of OH in about 202 g. of toluene. The procedure is carried out as described in Example 3 and an oil having the following physical data at about 20° C. is obtained: density=about 1.065 g./cc., viscosity=about 7540 cst., refractive index=$n_D^{20}$=about 1.4703.

Example 6

About 2385 g. of the polyether-isocyanate initial product described in Example 1 and containing about 0.75 mol of NCO groups are mixed with about 500 cc. of toluene, about 3 g. of triethylamine and about 425 g. of an α,ω-bis-(trimethyl-siloxy)-pentacis - (β - hydroxyethyl mercaptomethyl)-polymethyl siloxane which has about a 3% hydroxyl content and corresponds approximately to the formula

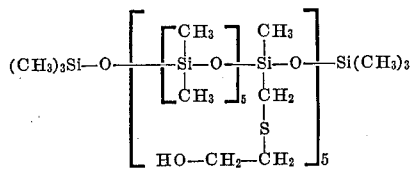

This mixture is boiled for about 4 hours under reflux. The solvent is then evaporated by heating at about 20 mm. Hg up to about 100° C. and the residue is filtered. A golden yellow oil containing about 7.8% of silicon and about 1.35% of sulfur is obtained as a filtrate. At 20° C., its viscosity is about 9030 cst. and its refractive index $n_D^{20}$ is about 1.4660.

Example 7

About 680 g. of a tris-(β-hydroxyethyl mecaptomethyl)-polymethyl siloxane having a hydroxyl content of about 3.75% and a sulphur content of about 7.3%, and corresponding approximately to the formula

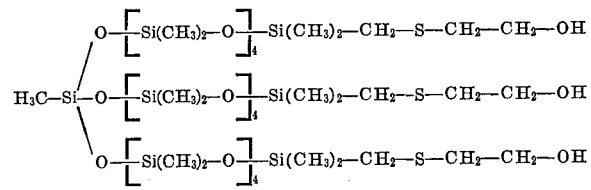

are mixed while stirring vigorously with about 50 cc. of anhydrous benzene and about 261 g. of toluylene-2,4 diisocyanate. A reaction begins immediately. After about 4 hours, the solvent is removed by heating the mixture at about 1 mm. Hg at a temperature of up to about 50° C. The reaction product which is left is a colourless, viscous oil with the refractive index $n_D^{20}$ of about 1.4893, an NCO content of about 6.1%, about 5.35% sulfur, and about 4.7% nitrogen (theoretical: 6.7% of NCO, 5.3% of S, 4.5% of N).

Example 8

About 176 g. of α,ω-bis-(β'-hydroxyethyl mercaptomethyl)-polydimethyl siloxane, as described in Example 1 having about 0.324 mol of OH, are mixed with about 500 cc. of anhydrous toluene, about 22.7 g. (0.13 mol) of toluylene 2,4 diisocyanate and about 2 cc. of triethylamine. The mixture is heated for about 4 hours; it is then filtered and the solvent is removed from the filtrate by heating at about 2 mm. Hg at a temperature of up to about 100° C. A viscous, yellowish oil is obtained which contains about 27.4% of silicon, about 5.2% of sulfur and about 2.4% of nitrogen. At about 20° C., the density of the oil is about 1.105 g./cc., its viscosity is about 35200 cst. and its refractive index $n_D^{20}$ is about 1.4548.

Example 9

About 423 g. of an α,ω-bis(β'-hydroxyethyl mercaptomethyl)-polydimethyl siloxane, which has a hydroxyl content of about 3.4% and corresponds approximately to the formula

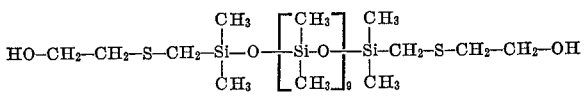

are mixed with about 500 cc. of toluene, about 57 g. of hexamethylene 1,6 diisocyanate and about 2 cc. of triethylamine. The mixture is boiled for about 4 hours under reflux, whereupon it is filtered and the solvent is removed from the filtrate by heating at a temperature of up to 100° C. at about 10 mm. Hg. A colourless, very viscous reaction product is obtained which has a refractive index $n_D^{20}$ of about 1.4472, a silicon content of about 25.3%, about 5.7% of sulfur and about 2.4% of nitrogen.

Example 10

About 149 g. of polypropylene glycol, containing about 5.7% of OH, are mixed with about 500 cc. of toluene and about 87 g. of toluylene 2,4 diisocyanate and the mixture is boiled for about 1 hour under reflux. About 283 g. of an α,ω-bis-(β'-hydroxyethyl mercaptomethyl)-polydimethyl siloxane similar to that of Example 1 containing 3% of OH and 2 cc. of triethylamine is added. The mixture is boiled for another 4 hours under reflux, filtered and the solvent is removed from the filtrate by heating at a temperature of up to about 100° C. at about 20 mm. Hg. A yellowish oil, containing about 14.9% of silicon and about 3.1% of sulfur is obtained. At about 20° C., the density of the oil is about 1.13 g./cc., its viscosity is about 16418 cst. and its refractive index $n_D^{20}$=about 1.4739.

Example 11

About 142 g. of the same α,ω-bis-(β'-hydroxyethyl-mercaptomethyl)-polydimethyl siloxane as used in Example 10 and containing 0.25 mol of OH are mixed with about 250 cc. of toluene and about 43.5 g. (0.25 mol) of toluylene-2,4 diisocyanate. The mixture is left standing for about 24 hours at room temperature. About 100 g. of polyethylene glycol, containing about 8.5% of OH, and having a molecular weight of 400 are then added. The mixture is heated for about 2 hours to about 50° C., filtered and the solvent is removed from the filtrate by heating at a temperature of up to 100° C. at 1 mm. Hg. A very viscous oil having a refractive index $n_D^{20}$ of about 1.4770, and containing about 14.9% of silicon and about 2.85% of sulfur is obtained.

Example 12

About 3180 g. of the polyether-isocyanate initial product as described in Example 1 and containing about 1 mol of NCO are mixed with 1 litre of toluene, about 4 cc. of triethylamine and about 755 g. of a tris-($\beta,\gamma$-dihydroxypropyl - mercaptomethyl) - polymethyl siloxane, which has a hydroxyl content of about 4.5% and corresponds approximately to the formula $$H_3C-Si \begin{cases} O-[-Si(CH_3)_2-O-]_7-Si(CH_3)_2-CH_2-S-CH_2-CH(OH)-CH_2-OH \\ O-[-Si(CH_3)_2-O-]_7-Si(CH_3)_2-CH_2-S-CH_2-CH(OH)-CH_2-OH \\ O-[-Si(CH_3)_2-O-]_7-Si(CH_3)_2-CH_2-S-CH_2-CH(OH)-CH_2-OH \end{cases}$$

The mixture is boiled for about 4 hours under reflux, filtered, the solvent is removed from the filtrate by heating at a temperature of up to about 100° C. at about 10 mm. Hg; it is filtered once more. A golden yellow oil containing about 7.6% of silicon and about 1.5% of sulfur is obtained. At about 20° C., the density of the oil is about 1.05 g./cc., its viscosity is about 11017 cst. and its refractive index $n_D^{20}$=about 1.4679.

Example 13

About 100 g. of the same polyalkylene glycol monobutyl ether as used in Example 1 are mixed while stirring vigorously with about 119 g. of a 20% solution of tri-(p-isocyanatophenyl)-methane in methyl chloride, containing about 0.195 mol of NCO. The mixture is left standing for about 2 hours at room temperature. A solution of about 80 g. of the same tris-($\beta$-hydroxyethyl mercaptomethyl)-polymethyl siloxane as was used in Example 7 dissolved in 100 cc. of toluene is then added and the mixture is left standing for about another 4 hours. The solvent is evaporated by heating at a temperature of up to about 90° C. at 2 mm. Hg. A dark red viscous oil containing about 11.5% of silicon and about 1.7% of sulfur is obtained. At about 20° C., the density of the oil is about 1.075 g./cc., its viscosity is about 15214 cst. and its refractive index $n_D^{20}$=about 1.4788.

Example 14

About 905 g. (1 mol) of an $\alpha,\omega$-bis-($\beta'$-hydroxyethyl-mercaptomethyl)-polydimethyl siloxane of the formula $$\begin{array}{c} CH_3 \\ | \\ HO-CH_2-CH_2-S-CH_2-Si-O \\ | \\ CH_3 \end{array} \begin{bmatrix} CH_3 \\ | \\ Si-O \\ | \\ CH_3 \end{bmatrix}_8 \begin{array}{c} CH_3 \\ | \\ Si-CH_2-S-CH_2-CH_2-OH \\ | \\ CH_3 \end{array}$$

are dissolved in about 1000 g. of toluene. About 348 g. (2 mols) of toluylene-2,4 diisocyanate is then added and the mixture is boiled for about one hour under reflux. About 280 g. (2 mols) of trimethylol propane, about 300 g. of toluene and about 3 g. of triethylamine are then added and the heating is continued for about another 3 hours. The solvent is thereafter evaporated while passing argon through the reaction mixture at about 20 mm. Hg and heating to about 100° C. A yellowish oil containing about 4.1% of sulfur is obtained.

Example 15

About 205.5 g. (0.3 mol) of an $\alpha,\omega$-bis-($\beta'$-hydroxyethyl-mercaptomethyl)-polydimethyl siloxane of the formula $$\begin{array}{c} CH_3 \\ | \\ HO-CH_2-CH_2-S-CH_2-Si-O \\ | \\ CH_3 \end{array} \begin{bmatrix} CH_3 \\ | \\ Si-O \\ | \\ CH_3 \end{bmatrix}_5 \begin{array}{c} CH_3 \\ | \\ Si-CH_2-S-CH_2-CH_2-OH \\ | \\ CH_3 \end{array}$$

are mixed with about 200 g. of anhydrous toluene and about 40.2 g. (0.1 mol) of tri-(p-isocyanatophenyl)-thionophosphate and the solution obtained is boiled for about one hour under reflux. About 1000 g. of a solution in toluene of about 532.2 g. of the addition product produced in the same manner as described in Example 1 from equimolar quantities of polyalkylene glycol monobutyl ether having a molecular weight of about 1600 and toluylene diisocyanate are added with about 2 g. of triethylamine. The mixture is boiled under reflux for about 4 hours. After evaporating the solvent and filtering, as described in Example 1, a golden yellow oil filtrate is obtained which has a sulphur content of about 2.4%.

Although the invention has been described in considerable detail in the foregoing, it is to be understood that any compound disclosed in the specification as suitable for the same purpose may be substituted for any other compound in the above examples, and that variations may be made by one skilled in the art without departing from the spirit and scope of the invention except as set forth in the claims.

What is claimed is:

1. The urethane modified mercaptomethyl siloxane having the formula $$G-O-M_z-G$$

wherein $z$ is a number between about 5 and 22; G is $$-(CH_3)_2Si-CH_2-S-CH_2-CH_2 \\ -O-X-(OR)_n-OC_4H_9$$

wherein $-(OR)_n$ is a radical of a polyalkylene glycol ether having equal parts of ethylene oxide and propylene oxide wherein $n$ is an integer sufficient to give the said radical a molecular weight of about 1600; and M is $-(CH_3)_2SiO-$; and X is $-OCNH-C_6H_4-NHCO-$.

2. The urethane modified mercaptomethyl siloxane having the formula $$CH_3-Si \begin{cases} O-M_a- \\ O-M_b- \\ O-M_c- \end{cases} [-(CH_3)_2Si-CH_2-S-CH_2-CHOH-CH_2-O-X-(OR)_n \\ -O-C_4H_9]_3$$

wherein M is $-(CH_3)_2SiO-$; X is $-OCNH-C_6H_4-NHCO-$; $-(OR)_n$ is a radical of a polyalkylene glycol ether having equal parts of ethylene oxide and propylene oxide wherein $n$ is an integer sufficient to give the said radical a molecular weight of about 1600; $a+b+c=6.1$.

3. The urethane modified mercaptomethyl siloxane having the formula $$\begin{array}{c} G-M_a-O \\ \phantom{G-M_a-O}\diagdown \\ G-M_b-O \diagup \end{array} Si-E-Si \begin{array}{c} O-M_c-G \\ \diagdown\phantom{O-M_c-G} \\ \diagup O-M_d-G \end{array}$$

wherein M is $-(CH_3)_2SiO-$; E is $$-O-(CH_3)_2Si-CH_2-S-CH_2-O \\ -CH_2-Si(CH_3)_2-O-$$

and G is $$-(CH_3)_2Si-CH_2-S-CH_2-CH_2 \\ -O-X-(OR)_n-OC_4H_9$$

and $a+b+c+d=30.8$; and X is —OCNH—C$_6$H$_4$—NHCO—; —(OR)$_n$ is a radical of a polyalkylene glycol ether having equal parts of ethylene oxide and propylene oxide wherein $n$ is an integer sufficient to give the said radical a molecular weight of about 1600.

4. The urethane modified mercaptomethyl siloxane having the formula

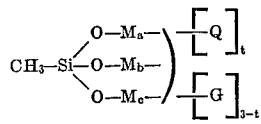

wherein M is —(CH$_3$)$_2$SiO—; Q is —(CH$_3$)$_2$Si—CH$_2$—S—CH$_2$—CH$_2$—OH; G is a member selected from the group consisting of

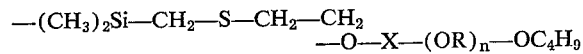

and

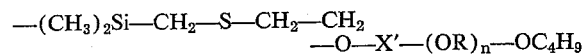

in which Formula X is —OCNH—C$_6$H$_4$—NHCO—, —(OR)$_n$ is a radical of a polyalkylene glycol ether having equal parts of ethylene oxide and propylene oxide wherein $n$ is an integer sufficient to give the said radical a molecular weight of about 1600, and X' is the same as X except that one of the urethane hydrogen atoms in X is replaced by the radical —OCNH—C$_6$H$_4$—NHCO—(OR)$_n$—OC$_4$H$_9$; $t$ is a number from 0 to 2 and $a+b+c$ is from about 2 to about 20.

5. The urethane modified mercaptomethyl siloxane having the formula

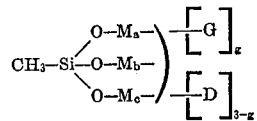

wherein M is (CH$_3$)$_2$SiO—; G is

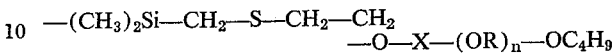

and D is

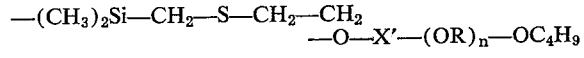

in which Formula X is —OCNH—C$_6$H$_4$—NHCO—, —(OR)$_n$ is a radical of a polyalkylene glycol ether having equal parts of ethylene oxide and propylene oxide wherein $n$ is an integer sufficient to give the said radical a molecular weight of about 1600, and X' is the same as X except that one of the urethane hydrogen atoms in X is replaced by the radical —OCNH—C$_6$H$_4$—NHCO—(OR)$_n$—OC$_4$H$_9$; $g$ is a number from 0 to 3 and $a+b+c$ is from about 2 to about 20.

References Cited
UNITED STATES PATENTS

| | | | |
|---|---|---|---|
| 2,527,590 | 10/1950 | Speier | 260—46.5 |
| 3,179,622 | 4/1965 | Haluska | 260—46.5 |
| 3,179,713 | 4/1965 | Brown | 260—825 |

TOBIAS E. LEVOW, *Primary Examiner.*

J. PODGORSKI, *Assistant Examiner.*